Aug. 24, 1937.   J. E. AISHER   2,090,928
MACHINE FOR MAKING TILES, SLABS, AND THE LIKE
Filed Nov. 12, 1936   2 Sheets-Sheet 2
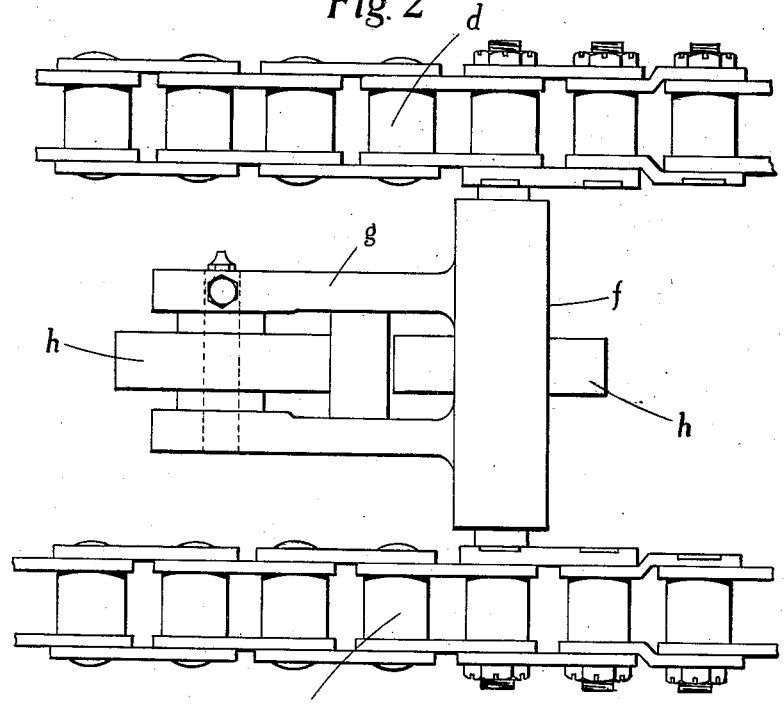
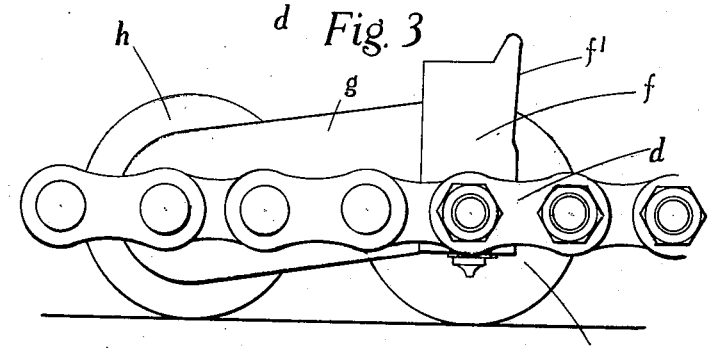
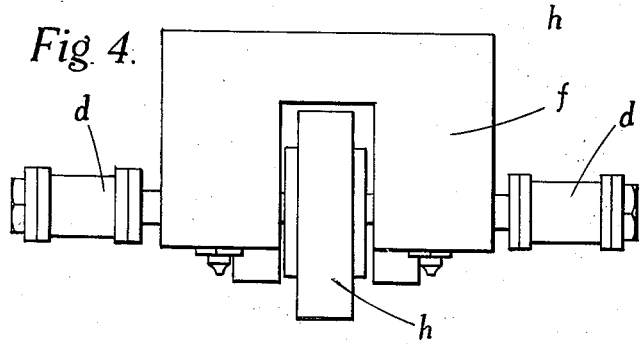
INVENTOR
JACK EDWARD AISHER
BY William C. Linton
ATTORNEY Patented Aug. 24, 1937

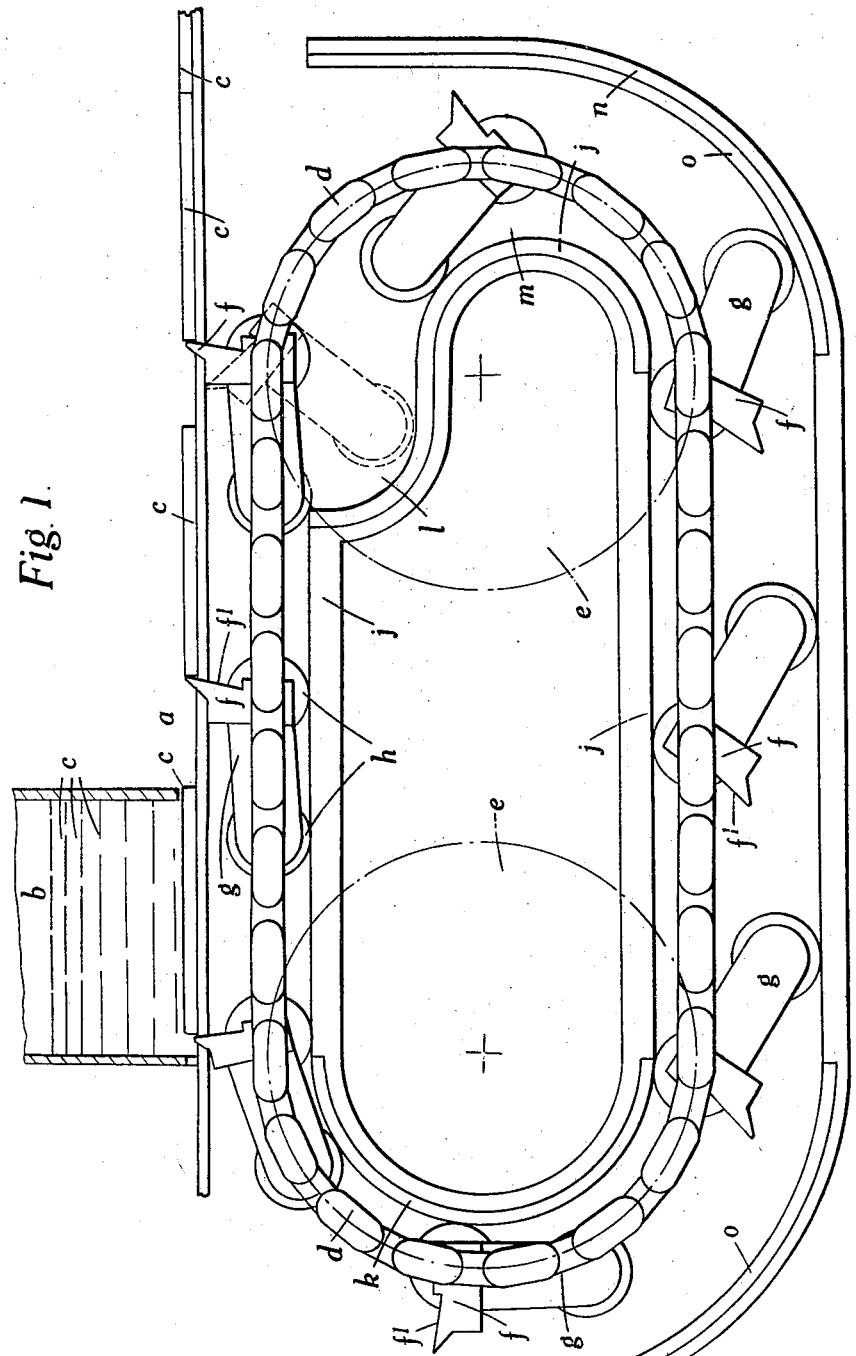

2,090,928

UNITED STATES PATENT OFFICE 2,090,928

MACHINE FOR MAKING TILES, SLABS, AND THE LIKE

Jack Edward Aisher, London, England, assignor to The Marley Tile (Holding) Company Limited, London, England Application November 12, 1936, Serial No. 110,542
In Great Britain October 9, 1936

5 Claims. (Cl. 25—42)

This invention relates to machines for making tiles, slabs and the like.

The inventtion further relates to such machines of the type in which a magazine is provided for the reception of a plurality of pallets and the pallets, one at a time, are taken from the magazine and pushed along the usual track rails by means of projections or "pushers" connected to a continuously running conveyor driven from the machine or some other convenient source.

The said "pushers" do not push each separate pallet along the entire length of the track rails, but only for a certain specified distance, after which the pallets abut against each other and are pushed along in a continuous line but intermittently and at a predetermined length of travel. It is essential that this predetermined length of travel is maintained in order that each pallet, with its load of plastic mass, may be correctly positioned in the machine for its particular treatment, for example, when cutting the plastic mass.

In all such machines at the present day, the conveyors, to which the "pushers" are connected, consist of a pair of chains which pass around sprocket wheels.

In order that the "pushers" can engage the rear edge of each pallet and push them along, they have to be raised above the level of the track rails carrying the pallets and then to be lowered to make way for the pallet following to abut against the one in front. This raising and lowering is effected by suitable positioning of the conveyor sprocket wheels.

However, this upward and downward movement of the "pushers" against the edges of the pallets causes a grinding action which in time wears away the front edges of the "pushers".

The material used for making the tiles or the like, being gritty, aids the grinding action.

The wearing away of the edges of the "pushers" and pallets affects the predetermined length of travel of the pallets, referred to above, with the result that defective tiles or the like are produced; for example, the tiles may be incorrectly positioned under the cutting knife, resulting in incorrect length and the cutting away of the nibs of the tile.

The object of this invention is to provide an improved construction of machine in which the above mentioned defects or disadvantages are eliminated.

To this end, a machine for making tiles, slabs and the like, of the type set forth, is characterized in that the "pushers" are pivotally mounted on the conveyor and are caused to travel around a cam track so shaped that as soon as the pallets have been pushed a certain specific distance, the "pushers" fall away rearwardly from and out of contact with the pallets and below the level of the track rails.

Each "pusher" may be mounted on a carrier having two wheels which bear on the said cam track, the front wheel being pivotally mounted on the conveyor.

Each "pusher" is preferably formed with a forwardly projecting front edge, so shaped that there is only a line contact between it and the rear edge of the pallet.

The invention will now be described with reference to the accompanying drawings in which Figure 1 is a side elevation, shown somewhat diagrammatically, of a pallet conveying means constructed in accordance with this invention, and Figures 2, 3, and 4 show in plan, side elevation and end elevation respectively, a "pusher" and carriage connected to the conveyor.

$a$ is one of the usual track rails, $b$ is a magazine mounted over the rails $a$ and $c, c$, are the pallets. $d, d$, are a pair of chains mounted on sprocket wheels $e, e$.

Each "pusher" $f$ is mounted on a carrier $g$ having two wheels $h, h$, the front one of which is mounted on a spindle carried by the two chains $d, d$.

$j$ is a cam track on which the two wheels $h, h$, travel. Portions of the cam track $j$, marked $k$, are faced with rubber pads for shock absorbing and sound deadening purposes.

$n$ is a guide plate, provided with rubber pads $o$ for a purpose hereafter described.

Each "pusher" $f$ is formed with a forwardly projecting front edge $f^1$. The purpose of this formation is that only a line contact is made between the said front edge and the pallet $c$ (see Figure 1).

It will be seen from Figure 1 that after each "pusher" $f$ has removed a pallet $c$ from the magazine $b$ and pushed it along the track $a$ for a certain distance, the rear wheel $h$ of the carrier $g$ descends the convex surface $l$ of the cam jack $j$. As soon as this descent takes place, the carrier turns on its pivot and causes the "pusher" $f$ to fall away rearwardly and out of contact with the pallet $c$. Shortly afterwards the rear wheel $h$ travels over the concave surface $m$, causing the carrier $g$ to turn right over until the rear wheel bears against the guide plate $n$.

The carriers $g$, after they descend the concave surface m and afterwards when they commence to ascend, are inclined to swing to and fro and the guide plate n prevents this.

As the "pushers" travel around, they assume their correct position for engaging other pallets on the magazine.

With a machine constructed with a pallet conveying means as above described, the possibility of any frictional action between the "pushers" and the pallets and consequential wearing away of the parts is eliminated.

Further, it is possible to run the machine at a very high speed with a consequential greater output.

What I claim is:

1. Pallet conveying means for machines for making tiles, slabs and the like of the type set forth, comprising a series of pushers, a mobile carriage supporting each of said pushers, an endless conveyor system having an end of said carriage pivotally connected thereto, a continuous cam track having said carriage bearing thereagainst for giving said pushers a desired motion and a second cam track for preventing an end of said carriage from dropping more than a given distance when said carriage is at the lower portion of said conveyor system.

2. Pallet conveying means for machines for making tiles, slabs and the like of the type set forth, comprising a series of pushers, a carriage supporting each of said pushers, rotatable means mounted at each end of said carriage, an endless conveyor system having an end of said carriages pivotally connected thereto, a continuous cam track having said rotatable means bearing thereagainst for giving said pushers a desired motion, and a second cam track having one of the rotatable means of each carriage bearing thereagainst for preventing an end of said carriage from dropping more than a given distance when said carriage is at the lower portion of said conveyor system.

3. Pallet conveying means for machines for making tiles, slabs and the like of the type set forth, comprising a series of pushers, conveyor means having said pushers pivotally connected thereto, and a cam track having said pusher in contact therewith and shaped so that as soon as said pallets have been moved a given distance said pusher will be guided so as to fall rearwardly from and out of contact with said pallets and below the level of their support.

4. Pallet conveying means for machines for making tiles, slabs and the like of the type set forth, comprising a series of pushers, each of said pushers having a forwardly projecting front edge formed therewith so shaped that there is only a line contact between the edge and a pallet, conveyor means having said pushers pivotally connected thereto, and a cam track having said pusher in contact therewith and shaped so that as soon as said pallets have been moved a given distance said pusher will be guided so as to fall rearwardly from and out of contact with said pallets and below the level of their support.

5. Pallet conveying means for machines for making tiles, slabs and the like of the type set forth comprising a series of pushers, a carriage supporting each of said pushers, a wheel rotatably mounted at each end of said carriage, endless chains mounted at each side of said carriages and having one wheel of each of said carriages pivotally connected thereto, a continuous cam track having the wheels of said carriages bearing thereagainst, the shape of said cam track being such that as soon as the pallets have been pushed a given distance the carriage of the pusher thereagainst will be guided so as to cause said pusher to fall rearwardly from and out of contact with said pallets and below the level of the support of said pallets and a second cam track having one of the wheels of each of said carriages bearing thereagainst for preventing an end of said carriage from dropping more than a given distance when said carriage is at the lower portion of said conveyor system.

JACK EDWARD AISHER.